United States Patent
Naether

(10) Patent No.: US 7,520,002 B2
(45) Date of Patent: Apr. 14, 2009

(54) METHOD FOR MANIPULATION IDENTIFICATION ON A SENSOR

(75) Inventor: Horst Naether, Villingen-Schwenningen (DE)

(73) Assignee: Siemens Aktiengesellschaft, Munich (DE)

( * ) Notice: Subject to any disclaimer, the term of this patent is extended or adjusted under 35 U.S.C. 154(b) by 637 days.

(21) Appl. No.: 10/563,807

(22) PCT Filed: Aug. 4, 2005

(86) PCT No.: PCT/EP2005/053820

§ 371 (c)(1),
(2), (4) Date: Jan. 9, 2006

(87) PCT Pub. No.: WO2006/027297

PCT Pub. Date: Mar. 16, 2006

(65) Prior Publication Data

US 2008/0048825 A1    Feb. 28, 2008

(30) Foreign Application Priority Data

Sep. 6, 2004   (DE) .................. 10 2004 043 052

(51) Int. Cl.
*G06F 11/00* (2006.01)
*G06F 11/30* (2006.01)
*H04L 9/32* (2006.01)
*H04N 7/167* (2006.01)

(52) U.S. Cl. ............................. 726/34; 726/32; 726/33; 713/193; 713/194; 380/201; 380/202; 380/203; 380/204

(58) Field of Classification Search ................. 726/34
See application file for complete search history.

(56) References Cited

U.S. PATENT DOCUMENTS

| 5,936,315 A | 8/1999 | Lais |
| 6,109,520 A | 8/2000 | Ricard |
| 6,144,927 A | 11/2000 | Mannesmann |
| 2003/0194088 A1 | 10/2003 | Fischer et al. |

FOREIGN PATENT DOCUMENTS

RU    2183352 C1    6/2002

OTHER PUBLICATIONS

2005Q23160CH Road Vehicles—Tachograph Systems; Reference No. 16844-3:2004 (E); ISO copyright office; Switzerland; copyright@iso.org; 39 Pages.
Derwent Abstract—RU 2183352 C1; Jun. 10, 2002; Marinichev Aleksandr Vasil'évich, Russia.

*Primary Examiner*—Longbit Chai
(74) *Attorney, Agent, or Firm*—Cohen Pontani Lieberman & Pavane LLP

(57) ABSTRACT

The present invention is a method for identification of manipulations on an arrangement which includes a sensor which emits pulses and a recording unit. As is the case with a tachograph, any possibility of manipulation must be overcome. For this purpose, the sensor transmits real time pulses to the recording unit and, cyclically in response to first request instructions, transmits higher data signals for a measurement, and receives a number of real time pulses in response to second request instructions which are offset in time with respect to the first request instructions. A data signal evaluation module compares the number of real time pulses with the number of data signal pulses and thus achieves a very high level of security against manipulation.

15 Claims, 1 Drawing Sheet

METHOD FOR MANIPULATION IDENTIFICATION ON A SENSOR

BACKGROUND OF THE INVENTION

The invention relates to a method for identification of manipulation to an arrangement comprising a sensor which emits pulses and a recording unit.

Particularly in the field of operating data recording for a commercial vehicle by means of a tachograph, it is essential to avoid manipulation on the basis of the original character of the recordings. In addition to the relevance of these recordings as evidence in legal disputes, the safety of the vehicle operation and labor-law aspects are also important here. With the new generation of digital tachographs in accordance with EU Order EU-VO 3821/85, these appliances are being developed against the requirement to reliably prevent manipulation of this new technology. One obvious method for deceitful manipulation of the recordings is the capability to modify, for example electromagnetically, the signal from a sensor which is generally fitted in the transmission area of the motor vehicle. For example, if the regularly pulsed signals from the sensor which are transmitted in real time could be delayed thus resulting in the recorded speed always being slower than the speed of travel.

One object of the invention is thus to make it harder to manipulate the transmission of a signal which is correlated with the distance traveled and/or with the speed from a sensor which emits pulses to a recording unit.

SUMMARY OF THE INVENTION

The invention proposes a method as claimed in claim 1 in order to achieve the object. The dependent claims contain advantageous developments of the method according to the invention.

The method according to the invention is used particularly advantageously for personnel-related recording of data relating to the operation of a motor vehicle, when the recording unit is in the form of a tachograph and the sensor which emits pulses transmits a signal which is unambiguously correlated with the distance traveled by the vehicle to the recording unit or to the tachograph, since this application is subject to particularly stringent requirements for manipulation security. The sensor which emits pulses is in this case advantageously in the form of a Hall probe and interacts with a rotating transmission component which has projections and cutouts alternately, and in this way, the permeability in the vicinity of the Hall probe measurably changes a pulsed signal, preferably an approximately square-wave signal. The sensor accordingly transmits to the recording unit real time pulses whose period duration is unambiguously correlated with the rotation frequency of the corresponding transmission component, and is unambiguously correlated with the vehicle speed and the distance traveled. The method according to the invention achieves excellent manipulation security in that the measurement results of the sensor measurement are transmitted to the recording unit both as real time pulses and as data signals. For this purpose, the sensor has a corresponding evaluation unit which translates the real time pulses into data signals with more information content, and which are then transmitted to the recording unit in parallel with the real time pulses. According to the invention, such transmission is initiated by the recording unit, in particular by a data evaluation module in the recording unit, by means of a first request instruction, to which the sensor responds with the data signal. Because of the cyclic transmission of the first request instruction to the sensor, the data signal evaluation module in the recording unit can complete the measurement of the sensor by means of the data signals without any gaps. The real time pulses which are transmitted from the sensor to the recording unit in parallel with the data signal are received by the recording unit by means of a real time signal interface, and the number of these pulses is added to form a number of real time pulses. The data signal evaluation module uses a second request instruction to request the number of real time pulses from the real time signal interface at cyclic intervals, and compares the difference between the number of real time pulses relating to the current request to that of the previous request for the number of pulses, which the data signal evaluation determined from the cyclically transmitted data signals for the same time period.

The data signal evaluation module thus always compares the numbers of real time pulses associated with the correct time interval for measurement with corresponding numbers of data signal pulses, and in order to ensure that there is no incorrect association during this process, the first request instruction and the second request instruction are transmitted offset by a specific time interval $\Delta t$. This time interval $\Delta t$ is matched to the cycle of the first request instructions and of the time difference in the signal transmission between the real time signal on the one hand and the real time pulses and the data signal.

The method according to the invention is particularly advantageous when the cyclic transmission of the data signal from the sensor to the recording unit takes place at regular time intervals, in particular at one-minute intervals. Approximately one-minute intervals have been found to be particularly advantageous since, particularly when using the method according to the invention for the recording function of a tachograph, with software in which the method is implemented being configured in a modular form in layers, the software modules can reliably complete one cycle during this time between the interfaces and the evaluation with respect to the processing and transmission of the real time signals and of the data signals.

A layered structure of the method according to the invention and a corresponding implementation in such a manner that data signal evaluation is arranged in a layer which produces, receives and processes raw data, result in major advantages in the implementation and in the event of changes, with a second layer, which communicates with the first layer, looking after the transfer of data in such a way that data is transformed conformally in accordance with data transmission protocols, or is additionally also scrambled. A third layer, which communicates with the second layer, comprising, by way of example, a serial data interface and a real time signal interface, in this case expediently addresses a processor register and generates processor interrupts for processing of data streams. One component of the second layer is expediently a transfer module, which transforms the data signals from the data signal evaluation module to a form which is matched to the data transmission protocol, and accordingly transforms received data signals which conform with the protocol from the sensor to the recording unit back, for internal further processing in the recording unit.

In order to prevent any manipulation, it is worthwhile for the recording unit to transmit the data signals to the sensor and for the sensor to transmit them to the recording unit in a scrambled form, and for a transfer module to be a component of the recording unit, which transfer module scrambles and descrambles data signals from the recording unit to the sensor and from the sensor to the recording unit, respectively. Real time pulses can expediently be transmitted from the sensor to a real time signal evaluation module essentially independently of this, without scrambling and without conforming with a data transmission protocol.

The real time signal evaluation module which converts real time pulses (which have been transmitted from the real time signal point) in particular to information about speed when using the method for a tachograph, is advantageously connected for signaling purposes to the data signal evaluation module, to which the results of this evaluation are transmitted as a second data signal. Such transmission and communication between the real time signal evaluation module and the data signal evaluation module expediently take place asynchronously by means of a communication memory which is arranged between the two modules.

In practice, it has been found to be worthwhile for the time interval between the first request instruction and the second request instruction to have a length of between 50 ms and 300 ms. A time interval of between 147 ms and 172 ms allows the best stability to be achieved for the method according to the invention, as well as minimal susceptibility to faults, so that the data signal evaluation always associates the number of real time pulses with a correct number of data signal pulses, and arrives at the correct comparison results.

BRIEF DESCRIPTION OF THE SEVERAL VIEWS OF THE DRAWINGS

In consequence, the invention will be explained in more detail using one specific exemplary embodiment and with reference to a drawing for illustrative purposes, in which.

DETAILED DESCRIPTION OF THE INVENTION

Figure 1:
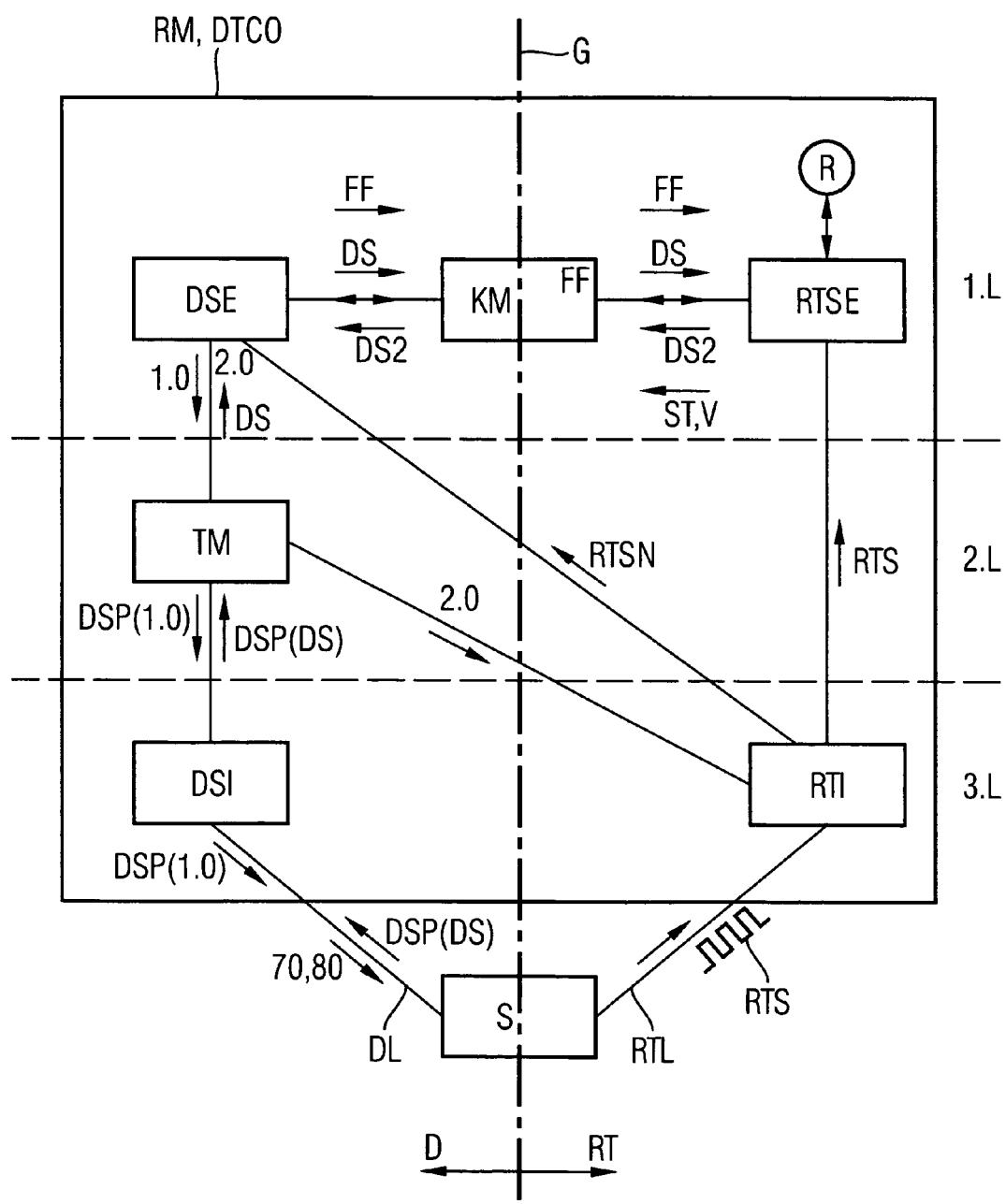
FIG. 1 shows a schematic illustration of the method according to the invention.

FIG. 1 shows an arrangement comprising a tachograph DTCO and a sensor S. The tachograph DTCO is connected to the sensor S by means of a real time signal line RTL and a data line DL. Major components of the tachograph DTCO are a serial data signal interface DSI, a transfer module TM, a data signal evaluation module DSE, a communication memory KM, a real time signal evaluation module RTSE and a real time signal interface RTI. The tachograph DTCO in this case carries out the function of a recording unit RM, according to the invention.

At the start of a signal transmission process, the tachograph DTCO sends authentication data 70 to the sensor S, initiated by the data signal evaluation DSE, followed by a response request 80. After successful authentication by both parties and the interchange of a session key, the tachograph DTCO and the sensor S start to transmit data related to the operation of the commercial vehicle, in accordance with ISO 16844-3. Every minute, the data signal evaluation module DSE uses a first request instruction 1.0 to initiate transmission of the measurement results from the sensor for the intermediate period as a data signal DS to the data signal evaluation module DSE. During this process, the method according to the invention operates in accordance with a layered implementation in such a way that the data signal evaluation module DSE transmits and receives the first request 1.0 and the data signal DS in the form of raw data, since the real time signal evaluation module RTSE, the communication memory KM and the data signal evaluation DSE are associated with a first layer 1.L.

First request instruction 1.0 is passed as raw data from the data signal evaluation module DSE to the transfer module TM, which is associated with the second layer 2.L. As an element in the second layer 2.L, the transfer module TM transforms the first request instruction 1.0 to a form in accordance with a data transmission protocol DSP.

The data signals which conform with the protocol are also scrambled by the transfer module TM, and are passed to an element in a third layer 3.L for implementation of the method according to the invention, specifically to the data signal interface DSI. The third layer 3.L addresses a process register at the lowermost level and generates interrupts in particular for the data interchange with the sensor S. The first request instruction is in this way passed via the data signal interface DSI by means of the data line DL to the sensor S. A corresponding path in the reverse direction with essentially inverse processes is used to take the data signal DS emitted from the sensor to the data signal evaluation module DSE.

Essentially independently of the processes D which are associated with the data signal DS and, illustrated schematically, are located on a side D, which is annotated D, of a boundary line G, processes which are associated with real time pulses RTS take place on the side RT, which is annotated RT, at the same time beyond this boundary line G. The sensor S uses the real time signal line RTL to send real time pulses RTS to the real time signal interface RTI.

The real time signal interface RTI, which is located in the third layer 3.L, transmits corresponding signals RTS to the real time signal evaluation module RTSE, with the number of real time signals RTS being continuously added to the number of real time pulses RTSN.

The data signal evaluation module DSE sends a second request instruction 2.0 to the real time signal interface RTI, with the interposition of the transfer module TM delayed by a specific time interval Δt with respect to the first request instruction 1.0, specifically by about 147 ms to 172 ms, matched to the processes, which take place in the second layer 2.L and in the third layer 3.L, for transmission of the data signal DS and of the first request instruction 1.0, respectively. The real time signal interface RTI transmits the number of real time pulses RTSN directly to the data signal evaluation module DSE with a corresponding time offset with respect to the arrival of the data signal DS from the sensor S in the data signal evaluation module DSE.

The data signal evaluation module DSE and the real time signal evaluation module RTSE interchange data asynchronously by means of the communication memory KM. The data signal evaluation module DSE compares the number of real time pulses RTSN with the number of data signal pulses DSN and, if there is a discrepancy between these two values that is greater than a specific no longer tolerable amount, sets a fault flag FF in the communication memory KM, and this fault flag FF is read there by the real time signal evaluation module RTSE. In this case, the fault flag FF is used as an indicator of manipulation and is passed to a recording memory R. At the same time, instead of the real time pulses RTS, the real time signal evaluation module RTSE receives the information from the data signal DS for determination of the distance traveled by the commercial vehicle.

A discrepancy which is defined as a limit is permissible in the comparison of the number of real time pulses RTSN and the number of data signal pulses DSN, and the fault flag FF is set if this discrepancy is exceeded.

Depending on the real time pulses RTS, the real time signal evaluation module RTSE transmits a motion signal V or a stop signal ST to the data signal evaluation module DSE.

If the real time signal evaluation module RTSE transmits the stop signal ST to the data signal evaluation module DSE, the data signal evaluation module DSE signals that the vehicle is stationary.

If the real time evaluation module RTSE does not transmit any signal V to the data signal evaluation module DSE in a situation in which the real time signal evaluation module RTSE identifies the "stop" state, and the real time signal interface RTI supplies an excessively low number of real time pulses RTSN=0 in comparison to the number of data signal pulses DSN, the fault flag FF is set and the distance traveled, as determined from the data signal, is used as the basis for recording, and the state is confirmed that the connection by means of the real time signal line RTL is faulty.

If the real time signal evaluation module RTSE transmits a signal V to the data signal evaluation module DSE in a situation in which the real time signal evaluation module RTSE identifies the "drive" state, and the real time signal interface RTI produces an excessively low number of real time pulses RTSN in comparison to the number of data signal pulses DSN, the fault flag FF is set and the distance traveled or speed of travel as determined from the data signal DS is used as the basis for recording.

If the data signal DS is completely absent for the purposes of the cyclic request instructions 1.0, the fault flag FF is likewise set and the state is confirmed that the connection by means of the data line DL is faulty.

The invention claimed is:

1. A method for identification of manipulation to an arrangement comprising a sensor which emits pulses and a recording unit (RM), the method comprising the steps of:
    transmitting, by the sensor, real-time pulses from a measurement to the recording unit,
    transmitting by, the recording unit, cyclically, a first request instruction to the sensor,
    in response to which transmitting, by the sensor, a first data signal which includes information about intermediate real-time pulses to the recording unit,
    providing a real-time signal interface which adds the real time pulses to form a number of real time pulses,
    providing a data signal evaluation module in the recording unit which determines the number of pulses based on the data signal to form a number of data signal pulses,
    transmitting by the data signal evaluation module a second request instruction to the real time signal interface in response to which the real time signal interface transmits the number of real time pulses to the data signal evaluation module,
    wherein the first request instruction and the second request instruction follow one another offset by a specific time interval, and
    wherein the data signal evaluation module compares the number of real time pulses and the number of data signal pulses with one another to provide a high level of security against deceitful manipulation of recordings.

2. The method according to claim 1, wherein the data signal is transmitted cyclically from the sensor to the recording unit at regular time intervals.

3. The method according to claim 1, wherein the sensor interchanges data signals with the recording unit on the basis of a data transmission protocol.

4. The method according to claim 3, further comprising the steps of:
    arranging a transfer module between the data signal evaluation module and the sensor,
    transforming the data signals from the data signal evaluation module to a form that is matched to the data transmission protocol, and
    transforming received data signals which conform with the protocol, from the sensor to the recording unit back for internal further processing in the recording unit.

5. The method according to claim 1, wherein the recording unit transmits the data signals to the sensor in scrambled form, and the sensor transmits the data signals to the recording unit in scrambled form, and one component of the recording unit is a transfer module which scrambles and descrambles data signals from the recording unit to the sensor, and from the sensor to the recording unit, respectively.

6. The method according to claim 1, wherein the recording unit has a real time signal interface which receives real time signals from the sensor, and has a data signal interface which interchanges data signals with the sensor.

7. The method according to claim 6, wherein the real time signal interface is connected for signal transmission purposes to a real time signal evaluation module, the real time signal evaluation module evaluates the real time signals, and produces a second data signal to the data signal evaluation module from the results of this evaluation.

8. The method according to claim 7, wherein the real time signal evaluation module interchanges data asynchronously with the data signal evaluation module by means of a communication memory.

9. The method according to claim 1, wherein the time interval is between 50 ms and 300 ms.

10. The method according to claim 1, wherein the recording unit transmits a first request instruction to the sensor every minute.

11. The method according to claim 1, wherein the recording unit enters a fault flag in the communication memory as a response to the cyclically transmitted first request instruction in the absence of a data signal.

12. The method according to claim 1, wherein the recording unit enters a fault flag in the communication memory if there is any difference greater than a specific limit in the number of real time pulses in the time-related comparison with the data signal, and the data signal is used as the basis for recording of the distance traveled.

13. The method according to claim 1, wherein a fault flag is set and/or the distance traveled, which is determined from the data signal, is used as the basis for recording, and/or the state is recorded in that the connection by means of the real time signal line is faulty when the real time evaluation module does not transmit any signal to the data signal evaluation module and the real time signal evaluation module identifies the "stop" state, and the real time signal interface produces an excessively low number of real time pulses in comparison to the number of data signal pulses.

14. The method according to claim 1, wherein a fault flag is set and the distance traveled or the speed of travel as determined from the data signal is used as the basis for recording, when the real time signal evaluation module transmits a signal to the data signal evaluation module and the real time signal evaluation module identifies the "drive" state and the real time signal interface produces an excessively low number of real time pulses in comparison to the number of data signal pulses.

15. The method according to claim 1, wherein the fault flag is set when the data signal is absent for the purposes of the cyclic request instructions and the state is recorded that the connection by means of the data line is faulty.

* * * * *